United States Patent [19]

Kocot et al.

[11] 4,404,573

[45] Sep. 13, 1983

[54] ELECTROSTATIC INK JET SYSTEM

[75] Inventors: Ray H. Kocot; Robert E. Rudd, III, both of Danbury; Douglas R. Arnoldi, Southbury, all of Conn.

[73] Assignee: Burroughs Corporation, Detroit, Mich.

[21] Appl. No.: 334,840

[22] Filed: Dec. 28, 1981

[51] Int. Cl.³ .......... G01D 15/16

[52] U.S. Cl. .......... 346/140 R; 346/75

[58] Field of Search .......... 346/140, 75

[56] References Cited

U.S. PATENT DOCUMENTS

| | | | |
|---|---|---|---|
| 3,060,429 | 10/1962 | Winston | 346/1.1 |
| 3,341,859 | 9/1967 | Adams | 346/140 |
| 3,886,565 | 5/1975 | Kojima | 346/140 |
| 3,887,928 | 6/1975 | Ohno | 346/140 |
| 4,349,830 | 9/1982 | Rudd | 346/140 |

*Primary Examiner*—Joseph W. Hartary

*Attorney, Agent, or Firm*—Mark T. Starr; Edmund M. Chung; Kevin R. Peterson

[57] ABSTRACT

An improved electrostatic ink jet system is disclosed which provides ink upon demand to print upon plain paper. The demand signal is the application of an increased voltage level over an existing or bias level. The termination of this increased voltage level, of course, stops the ink flow to end the printing operation. The ink jet assembly includes an ink jet of reduced length by the inclusion of a conductive surface at a predetermined point along the ink jet length. The assembly therefore has a unique physical shape which provides improved electrical and mechanical characteristics.

21 Claims, 5 Drawing Figures

ELECTROSTATIC INK JET SYSTEM

BACKGROUND OF THE INVENTION

A. Field of the Invention

This invention relates, in general, to electrostatic ink jet printers and, in particular, to an ink jet printer cartridge having an ink jet nozzle of a predetermined length which cartridge provides a low-head pressure, high flow, single filament ink jet that delivers fluid ink to a point in a controlled manner.

B. Prior Art

In the past, electrostatic ink jets used a long tube as the jet nozzle. This long nozzle length restricted fluid flow due to viscous drag. To increase this ink flow, the head height of the ink surface could have been increased, but this increase not only caused dripping of ink out of the jet nozzle tip but caused frequency response problems as well. Likewise, the increase in ink flow could have been obtained by using a larger diameter ink jet or a lower viscosity ink. In the case of the larger diameter jet, control problems were created, whereas low viscosity inks were difficult to develop.

Another problem that existed in the past was the limitation of the writing voltage that could be applied. This maximum writing voltage was determined by the point where a pair of filaments appeared on the ink meniscus. These filaments leave the nozzle at two points where the voltage gradients are the same. This limited the voltage that could be applied for control of the ink.

BRIEF DESCRIPTION OF THE INVENTION

A. Objects

It is a general object of the present invention to eliminate these and other problems of the prior art by providing an on-demand, low-head pressure, high-flow, single filament, electrostatic ink jet system which does not require the recycling of ink.

It is a further object of the present invention to provide an ink jet nozzle having increased ink flow.

It is a still further object of the present invention to provide an ink jet system having an ink jet assembly with a nozzle having a predetermined shortened length.

It is another object of the present invention to provide an ink jet assembly having a metal plate or other field shaping means positioned on the nozzle of said assembly close to the end of said assembly.

It is a still further object of the present invention to provide a low-head pressure, high flow, single filament, electrostatic ink jet system having a shortened nozzle which significantly increases the ink flow and a metal plate positioned on said nozzle close to the jet which moves the voltage gradient lines closer together to allow a higher voltage gradient to be applied to the ink and still maintain a single filament.

B. Summary of the Invention

A low-head pressure, high flow, single filament ink jet assembly is disclosed which utilizes a shortened nozzle to provide increased ink flow and a metal plate positioned on said nozzle near the jet end thereof to allow an increased voltage gradient to be applied to the ink and still maintain a single ink filament.

The ink jet assembly functions in an on-demand mode in response to an applied voltage gradient. Since ink does not flow in the absence of the voltage gradient, there is no need to recycle ink.

DETAILED DESCRIPTION OF THE INVENTION

Figure 1:
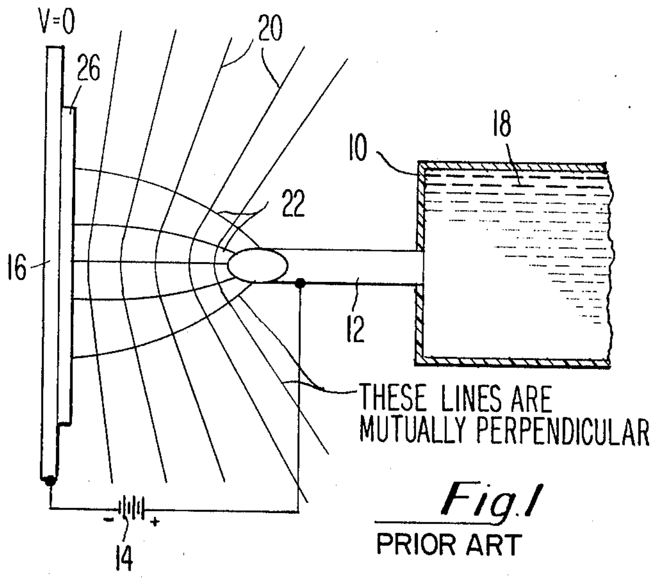
Fig.1 PRIOR ART
FIG. 1 is a top plan view with portions broken away of an ink jet assembly as set forth in the prior art.

Referring first to FIG. 1, there is shown the prior art configuration of an electrostatic ink jet printer. The ink supply 18 is contained in the ink reservoir 10. An ink jet 12 is mounted to the reservoir 10. The voltage source 14 is connected between the ink jet 12 and a metallic plate 16. This voltage source 14 serves as the bias voltage and is approximately 2000 V in the present preferred embodiment.

Figure 2:
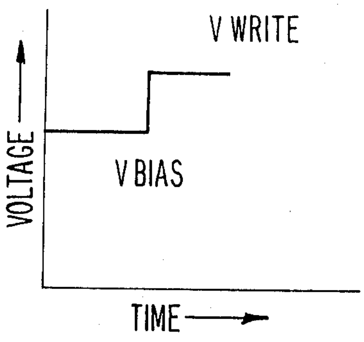
FIG. 2 illustrates the voltage pulse necessary to cause the ink to flow between the ink supply and a metallic surface.

FIG. 2 illustrates the writing signal that is applied between the ink jet 12 and the metallic plate 16 to cause ink 18 to flow from the ink reservoir 10 to the printing paper surface 26. Thus, when a narrow pulse writing signal above the threshold voltage level is applied, a short duration filament of ink 18 is dispensed from the nozzle 12. If on the other hand, the duration of the writing pulse signal is lengthed, a filament of longer duration will be dispensed from nozzle 12.

Returning to FIG. 1, the lines of constant potential (voltage) 20 emanate around the ink jet 12 in the configuration shown. The directions of voltage gradients are indicated by lines 22 which are locally perpendicular. These lines 22 also indicate the axis of a force on a charged particle within the field. The paper 26, i.e., the printing surface, needs some conductivity and the resistivity suggested in the present embodiment is less than $10^{14}$ ohm-centimeters.

Figure 3:
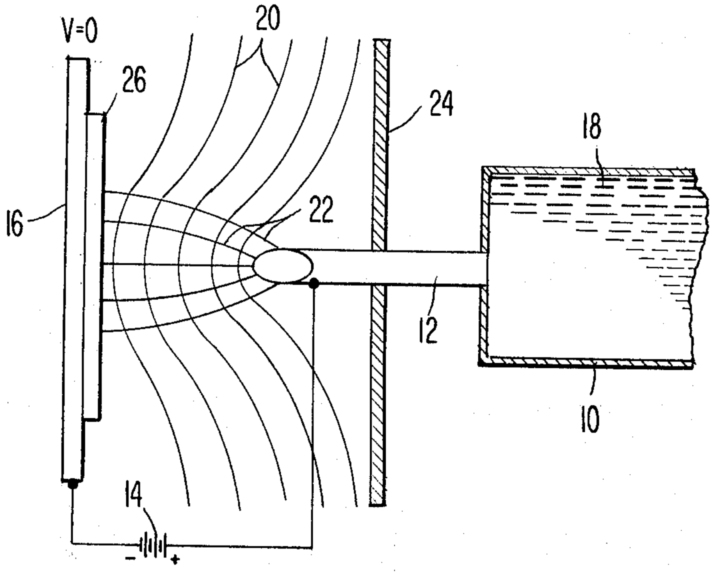
FIG. 3 is a top plan view with portions broken away of the improved ink jet assembly with the metal plate mounted on the nozzle as shown.
Figure 5:
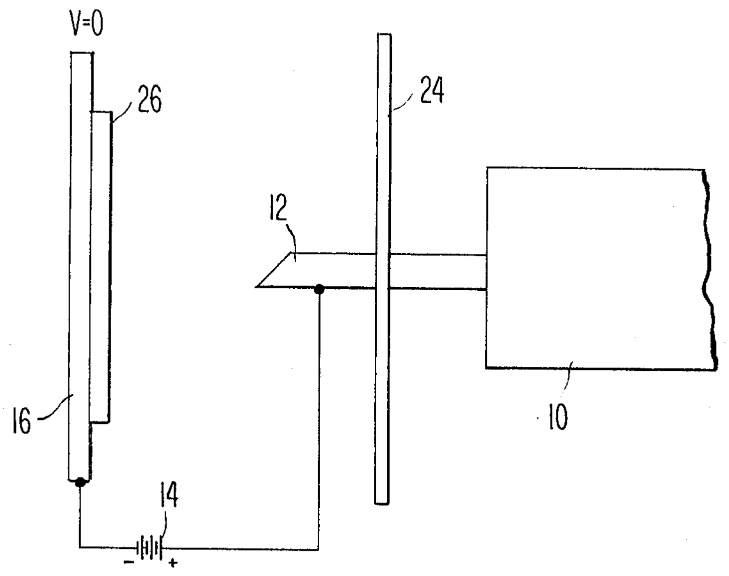
FIG. 5 is a side plan view of the ink jet assembly of FIG. 3.

Referring next to FIGS. 3 and 5, there is shown the same ink jet configuration as illustrated in FIG. 1 but with the addition of a metal ring or washer 24. The mounting of this metal washer near the end of the jet gives approximately a 10% increase in the density (darkness) of the copy. This improvement is due to the more uniform field resulting from the inclusion of the ring 24. Conductive ink filaments tend to diverge in an electric field causing a mist of the ink droplets. These droplets are less controlled than a single filament and provide a less dense (dark) copy. The inclusion of the ring 24 allows a higher electric field 14 to be applied to the ink 18, which higher field, in turn, provides a greater amount of control over the ink filament.

In the preferred embodiment of the present invention, the ink reservoir 10 is formed from a moldable material such as polypropylene which is also resistant to chemical reaction with the ink 18. The nozzle 12 is fabricated from stainless steel hypodermic-type tubing.

Figure 4:
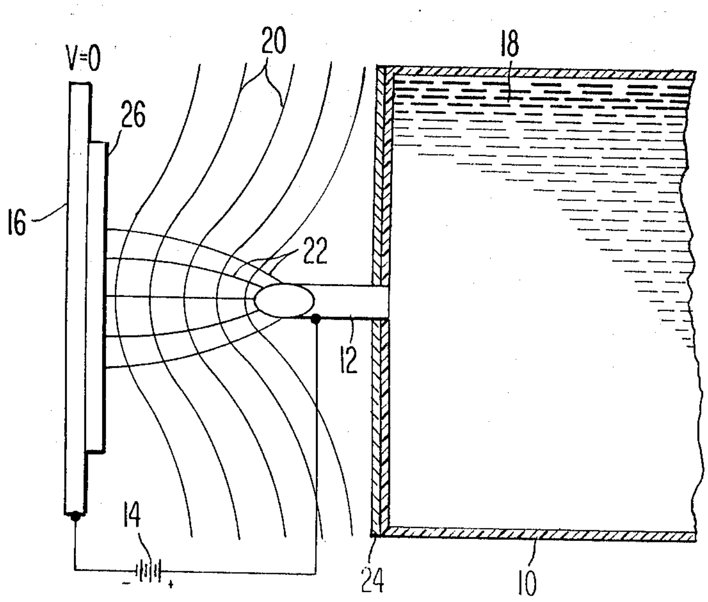
FIG. 4 is a top plan view with portions broken away of the improved ink jet assembly configuration showing the shortened nozzle and the use of the larger ink reservoir with the end of the reservoir being utilized as the metal plate or washer.

In FIG. 4, there is shown an alternate embodiment of the present invention. In this combination, the washer or ring 24 is now positioned upon the end of the reservoir 10, the reservoir 10 containing a much larger ink source 18 than in the embodiment of FIG. 3. As another alternative to the embodiment of FIG. 4, the washer or ring 24 could be eliminated and instead the end portion of the ink reservoir 10 connected to the nozzle 12 could be fabricated from a conductive material. In either case, the length of the nozzle 12 has been shortened as much as possible to provide optimum ink flow.

The ink flow is described by the equation:

$$\dot{m} = \frac{p\pi D^4 gh}{128\ VL}$$

where
$\dot{m}$ = mass flow of ink
$p$ = density of fluid (ink) - which is essentially constant
$V$ = kinematic viscosity of ink
$g$ = gravity - which is also essentially constant
$D$ = inner diameter of nozzle
$h$ = head height of fluid above center line of ink jet nozzle
$L$ = length of jet nozzle It has been discovered that there is a typical ink flow for printing based upon cosmetics, said flow being at a rate of about $2.7\times10^{-2}$ gm/min.

The frequency response (reaction time) depends upon the mass of the meniscus of ink on the end of the jet 12. The less the mass, the faster it can respond. Since the density of the fluid is essentially constant, the volume of the meniscus must be decreased to increase frequency response. This can be done by decreasing the diameter of the jet 12 and decreasing the head height. This drastically decreases the mass flow of ink 18 given by the above equation.

To return the mass flow of ink 18 back up to the required value, there are two variables still available, the viscosity of the ink 18 and the length of the nozzle 12. Since the viscosity of the ink 18 has a practical lower limit of 10 centipoises (cps), the length of the jet nozzle 12 must be very short. In the past, this length has been approximately 0.400 inches. The new improved length in the preferred embodiment is approximately 0.070 inches. The improvement in the ink 18 flow accomplished by this change is 0.400/0.070=5.7 times. In other words, the reduction in the length of the ink jet nozzle 12 only affects or controls mass flow and has little or nothing to do with frequency response. Consequently, it was chosen as the element to be improved.

It will be understood from the foregoing that various changes may be made in the preferred embodiment illustrated herein.

Thus, in place of the metal washer 24, a cylindrical or cone shaped member could be mounted axially on the nozzle 12 in order to still further improve performance.

As another variation, a moving drum with paper mounted on it could be substituted for the sheet of paper 26. In such a configuration, lines could be printed on the drum by extending the duration of the voltage pulse applied, thus causing a steady flow of ink 18 to be dispensed from the nozzle 12 onto the moving paper 26 surface.

It is therefore intended that the foregoing material be taken as an illustration only and not in a limiting sense, the scope of the invention being defined by the following claims.

What is claimed is:

1. A low-head pressure, high flow, single filament ink jet system capable of delivering fluid to a particular point in a controlled manner comprising:
an ink reservoir containing conductive ink;
an ink jet nozzle of predetermined length conductively connected to said conductive ink;
a first conductive surface means;
a printing surface interposed between said first conductive surface means and said ink jet nozzle;
a second conductive surface means mounted on said ink jet nozzle; and
a potential source connected between said first conductive surface means and said ink jet nozzle, the application of said potential source creating an electrostatic field between said ink jet nozzle and said first conductive surface means, said second conductive surface means for reshaping the lines of force of said electrostatic field.

2. The ink jet system in accordance with claim 1 wherein the predetermined length of said ink jet nozzle is approximately 0.070 inch.

3. The ink jet system in accordance with claim 1 wherein said first conductive surface means is metallized.

4. The ink jet system in accordance with claim 1 wherein said printing surface is coated with a conductive material.

5. The ink jet system in accordance with claim 1 wherein said printing surface is a nonconductive paper.

6. The ink jet system in accordance with claim 1 wherein said second conductive surface means has a washer shape, said ink jet nozzle passing through the hole in said washer shaped second conductive surface means.

7. The ink jet system in accordance with claim 1 wherein said second conductive surface means has a hole through it, said ink jet nozzle passing through the hole in said second conductive surface means.

8. The ink jet system in accordance with claim 1 wherein said second conductive surface means is formed in the shape of a cylinder, said ink jet nozzle passing through a hole in said cylinder shaped second conductive surface means.

9. The ink jet system in accordance with claim 1 wherein said second conductive surface means is formed in the shape of a cone, said ink jet nozzle passing through a hole in said cone shaped second conductive surface means.

10. The ink jet system in accordance with claim 1 or 6 or 7 wherein said second conductive surface means is positioned adjacent to and in contact with one side of said ink reservoir.

11. The ink jet system in accordance with claim 1 wherein the non-dispensing end of said ink jet nozzle is aligned with a hole in said ink reservoir, whereby said conductive ink may flow from said ink reservoir through said ink jet nozzle and be dispensed from the dispensing tip of said ink jet nozzle.

12. The ink jet system in accordance with claim 11 wherein said ink jet nozzle is fabricated from metal.

13. The ink jet system in accordance with claim 1 wherein said ink reservoir is fabricated from a nonconductive material.

14. The ink jet system in accordance with claim 1 wherein said second conductive surface means is fabricated from metal.

15. A low-head pressure, high flow, single filament ink jet system capable of delivering fluid to a particular point in a controlled manner comprising:
an ink reservoir containing conductive ink;
an ink jet nozzle of selected length conductively connected to said conductive ink;

said ink reservoir having a conductive end portion, which end portion is that nearest said ink jet nozzle;

a first conductive surface means;

a printing surface interposed between said first conductive surface means and said ink jet nozzle; and a potential source connected between said ink jet nozzle and said first conductive surface means whereby the conductive end portion of said ink reservoir deflects and reshapes the electrostatic lines of force created by the application of the voltage from said potential source to enable an increased potential difference between said ink jet nozzle and said first conductive surface means while maintaining a single filament ink flow.

16. The ink jet system in accordance with claim 15 wherein said ink jet nozzle length is approximately 0.070" between the tip of said nozzle and the metallized surface of said ink reservoir.

17. The ink jet system in accordance with claim 15 wherein the head pressure of the conductive ink in said ink reservoir is in the range of 0.050 to 0.200 of an inch.

18. The ink jet system in accordance with claim 15 wherein said printing surface is paper having a resistivity of less than $10^{14}$ ohm-cms.

19. The ink jet system in accordance with claim 15 wherein said printing surface is coated with a conductive material.

20. The ink jet system in accordance with claim 15 wherein the non-dispensing end of said ink jet nozzle is aligned with a hole in the conductive end portion of said ink reservoir, whereby said conductive ink may flow from said ink reservoir through said ink jet nozzle and be dispensed from the dispensing tip of said ink jet nozzle.

21. The ink jet system in accordance with claim 15 wherein said ink jet nozzle is fabricated from metal.

* * * * *